April 29, 1924.
L. E. MORRIS
1,492,386
DIRIGIBLE HEADLIGHT
Filed May 28, 1923
2 Sheets-Sheet 1
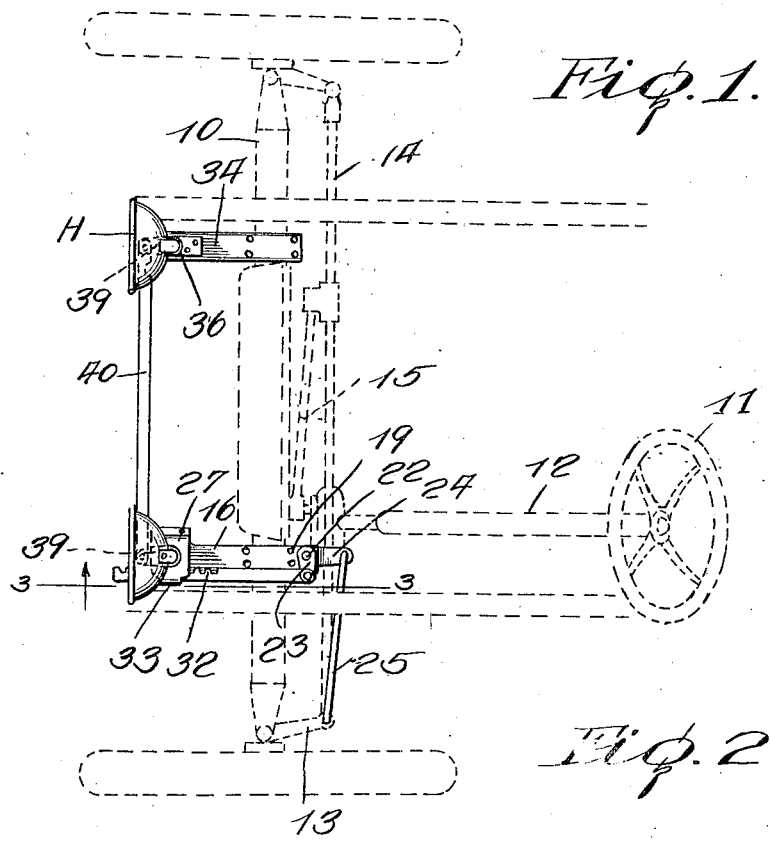
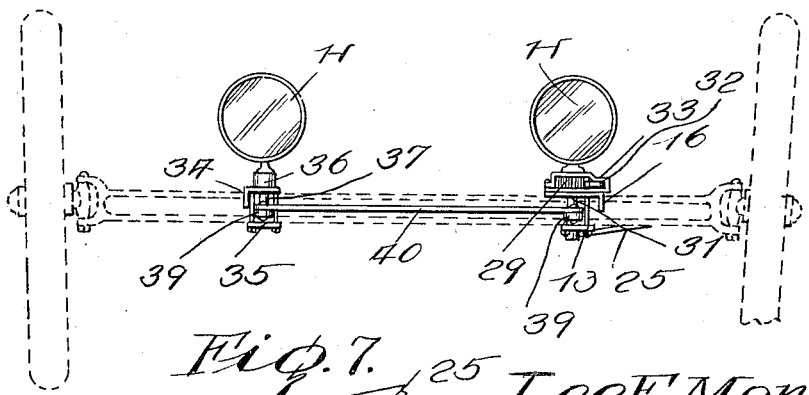
Inventor
Lee E. Morris
By Watson E. Coleman
Attorney April 29, 1924.
L. E. MORRIS
1,492,386
DIRIGIBLE HEADLIGHT
Filed May 28, 1923
2 Sheets-Sheet 2
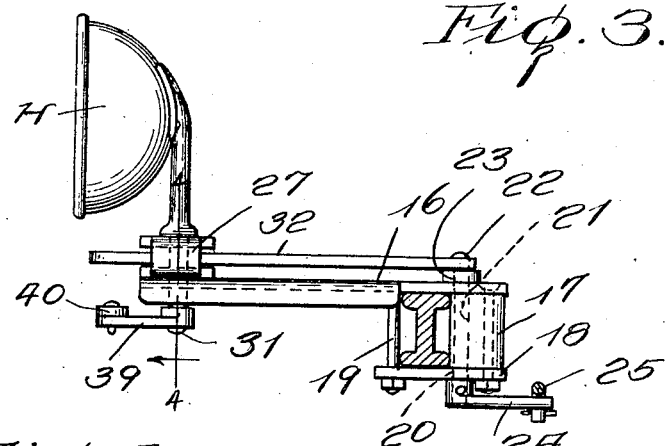
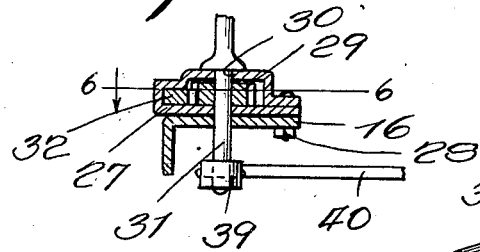
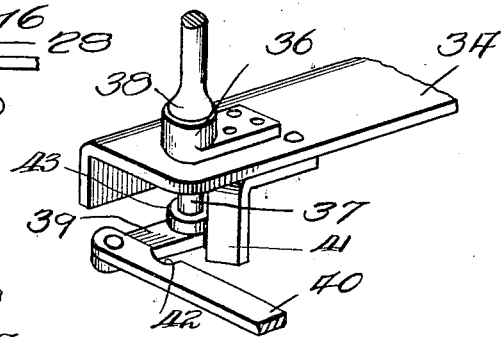
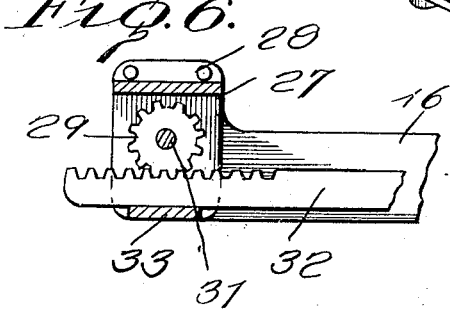
Inventor
Lee E. Morris
By Watson E. Coleman
Attorney Patented Apr. 29, 1924.

1,492,386

UNITED STATES PATENT OFFICE.

LEE E. MORRIS, OF JACKSON SUMMIT, PENNSYLVANIA.

DIRIGIBLE HEADLIGHT.

Application filed May 28, 1923. Serial No. 642,066.

*To all whom it may concern:*

Be it known that I, LEE E. MORRIS, a citizen of the United States, residing at Jackson Summit, in the county of Tioga and State of Pennsylvania, have invented certain new and useful Improvements in Dirigible Headlights, of which the following is a specification, reference being had to the accompanying drawings.

This invention relates to dirigible headlights.

An important object of the invention is to provide a headlight mounting for motor vehicles which may be readily applied to the vehicle without any material change in the structure thereof and which upon its application connects the headlights with the steering wheels in such a manner as to cause the headlights to be codirectional with the steering wheels at all times.

A further object of the invention is to provide a novel and improved means for connecting the headlights to the steering mechanism to be operated thereby.

These and other objects I attain by the construction show in the accompanying drawings, wherein for the purpose of illustration is shown a preferred embodiment of my invention and wherein:—

Figure 1 is a plan view showing dirigible headlight mechanism applied to the vehicle in accordance with my invention;

Figure 2 is a front elevation thereof;

Figure 3 is a sectional view taken through the axle on the line 3—3 of Figure 1;

Figure 4 is a section on the line 4—4 of Figure 3;

Figure 5 is a perspective showing the mounting of one of the headlights;

Figure 6 is a section on the line 6—6 of Figure 4; and

Figure 7 is a detail view showing the manner of connecting the headlight control to the steering mechanism.

Referring now more specifically to the drawings, the numeral 10 indicates the front axle of a vehicle, 11 the steering wheels thereof mounted upon the usual steering spindles 12, the rearwardly extending arms of which are pivotally connected by a transversely extending link 14 operatively connected by a bar 15 with the arm of the lower end of the steering post, (not herein disclosed).

In accordance with my invention I provide the axle adjacent one end thereof with a forwardly extending arm 16, the rear end of which rests upon the axle and is provided rearwardly of the axle with a downwardly directed bearing 17, preferably of a thickness approximating the vertical height of the axle 10. Abutting the under surface of this bearing and the under surface of the axle is a clamping plate 18 secured to the arm 16 by means of clamping bolts 19, so that this plate engages against the axle to hold the arm rigidly in its forwardly extending position. The plate 18 is provided with an aperture 20 aligning with the bore 21 of the bearing 17 and through this bore is directed a rock shaft 22 provided upon the upper surface of the arm 16 with a crank 23 directed transversely of the vehicle and upon its lower end with a removably connected crank 24 extending longitudinally of the vehicle and abutting the under surface of the plate 18. To the rear end of the crank 24 is pivotally connected one end of a link 25, the opposite end of which is engaged with the steering mechanism by removing the securing element ordinarily connecting the adjacent end of the link 14 with the arm 13 of the spindle 12 and inserting the downturned end 26 of the link as a substitute for this securing element.

Upon the outer end of the arm 16 is mounted a removable plate 27 secured to the arm at one end, as indicated at 28, and having the major portion thereof in spaced relation to the plate. Between the removable plate 27 and the arm 16 is mounted a pinion 29, the bore of the pinion being aligned with aligned openings 30 formed in the arm and plate for the reception of a stem 31 of a vertically disposed support for a headlight H, the pinion being secured to the stem. With this pinion meshes a rack 32 held in engagement therewith by the flanged free end 33 of the plate 27, this flange bearing against the outer face of the rack bar and preventing the disengagement thereof from the pinion. The inner end of the rack bar is pivotally connected to the free end of the crank 33.

At the opposite side of the vehicle I provide a second forwardly extending arm 34 secured to the axle by means of a clamping plate 35 and provided at its forward end with a vertically extending bar 36 for the stem 37 of a second headlight H, the stem being provided above the bearing with a stop collar 38 limiting its downward movement therethrough. The lower ends of the stems 31 and 37 are provided with parallel angular extensions 39 connected by a link 40. It will be seen that upon shifting of the steering mechanism to change the directions of the wheels, the shifting movement of the mechanism will be imparted to the headlight of the stem 31 through the link 25, crank 24, rock shaft 22, crank 23, rack bar 32 and pinion 29, the engagement of these parts causing the headlight to move in the direction of movement of the wheels. Connecting link 40 between the headlights will cause the second headlight H to be operated in conjunction with the first and, accordingly, both headlights will assume the same position with respect to the vehicle as the steering wheels thereof.

Upon the arm 34 at the under surface thereof is disposed a downwardly projecting stop member 41 against which the arm 39 of a headlight spindle stem 37 engages to limit the movement of the arm 39 in one direction. Movement of the arm in the opposite direction is limited by the engagement of the link 40 with the arm, the link having a notch 42 receiving the hub portion 43 of the arm 39 when in its extreme position.

It will be seen from the foregoing that mechanism constructed in accordance with my invention may be readily applied to a vehicle and involve no change in the structure thereof, other than the removal of the securing connection between the link 14 and one arm 13 of a spindle 12 in this application. It will furthermore be obvious that by this mechanism the driver of the vehicle will be provided with light during the turning movements of the vehicle which is directed in the direction in which the vehicle is turning. Many changes being possible in the various details of the construction hereinbefore set forth I do not limit myself to the specific structure thereof except as hereinafter claimed.

I claim:—

1. In combination with a vehicle embodying the usual steering link and spindles connected thereto, a headlight mounted for rotation upon a vertical axis, a vertically mounted rock shaft, a pair of cranks on said rock-shaft, a link pivotally connected to one of said cranks at one end and engaging the adjacent spindle arm and end of the steering link to pivotally connect the same with its opposite end, and a connection between the other crank of the rock shaft and the headlight whereby the headlight is rotated upon movement of the steering link to shift the spindle arms, comprising a support through which the headlight is directed, a pinion secured to the headlight stem and resting upon the support, and a rack connected at one end to the last named crank of the rock shaft and engaging with its opposite end the pinion of the headlight stem.

2. In combination with a vehicle embodying the usual steering link and spindles connected thereto, a headlight mounted for rotation upon a vertical axis, a vertically mounted rock shaft, a pair of cranks on said rock shaft, a link pivotally connected to one of said cranks at one end and engaging the adjacent spindle arm and end of the steering link to pivotally connect the same with its opposite end, and a connection between the other crank of the rock shaft and the headlight whereby the headlight is rotated upon movement of the steering link to shift the spindle arms, comprising a support through which the headlight is directed, a pinion secured to the headlight stem and resting upon the support, and a rack connected at one end to the last named crank of the rock shaft and engaging with its opposite end the pinion of the headlight stem, and a plate secured to said support maintaining said pinion against vertical movement and said rack in engagement with the pinion.

3. In combination with a vehicle embodying the usual steering link and spindles connected thereto, an axle adjacent which the steering link operates, an arm abutting the axle with its rear end and provided at one side of the axle with a vertically directed bearing, a plate abutting the under surface of the bearing and the axle and secured to the arm to clamp the arm to the axle, the plate having an opening aligned with the bore of the bearing, a rock shaft extending through said bearing and plate and provided above the arm and beneath the plate with crank arms, a headlight vertically mounted upon the forward end of the arm, a connection between the upper crank of the rock shaft and the headlight whereby the headlight is rotated when the rock shaft is rotated, and a link pivotally connected to the other crank of the rock shaft and provided with an end portion pivotally connecting the last named link to the steering link and the steering link to the spindle.

In testimony whereof I hereunto affix my signature.

LEE E. MORRIS.